US008085661B2

United States Patent
Harada et al.

(10) Patent No.: US 8,085,661 B2
(45) Date of Patent: *Dec. 27, 2011

(54) CONTROL CHANNEL ALLOCATION APPARATUS, MOBILE COMMUNICATIONS SYSTEM, AND CONTROL CHANNEL ALLOCATION METHOD

(75) Inventors: Atsushi Harada, Kawasaki (JP); Sadayuki Abeta, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 106 days.

This patent is subject to a terminal disclaimer.

(21) Appl. No.: 12/092,945

(22) PCT Filed: Nov. 10, 2006

(86) PCT No.: PCT/JP2006/322446
§ 371 (c)(1),
(2), (4) Date: May 5, 2009

(87) PCT Pub. No.: WO2007/055311
PCT Pub. Date: May 18, 2007

(65) Prior Publication Data
US 2009/0323597 A1    Dec. 31, 2009

(30) Foreign Application Priority Data
Nov. 11, 2005    (JP) .................................. 2005-327820

(51) Int. Cl.
*G01R 31/08* (2006.01)
(52) U.S. Cl. ....................................................... 370/230
(58) Field of Classification Search .................. None
See application file for complete search history.

(56) References Cited

U.S. PATENT DOCUMENTS

| 5,740,534 | A * | 4/1998 | Ayerst et al. ................. 340/7.42 |
| 7,254,117 | B2 * | 8/2007 | Choi et al. ..................... 370/318 |
| 7,672,685 | B2 * | 3/2010 | Itoh ............................... 455/522 |
| 2002/0115467 | A1 | 8/2002 | Hamabe |
| 2002/0141436 | A1 | 10/2002 | Toskala |
| 2003/0157900 | A1 | 8/2003 | Gaal et al. |
| 2003/0185242 | A1 | 10/2003 | Lee et al. |
| 2009/0262655 | A1* | 10/2009 | Harada et al. ................. 370/252 |

(Continued)

FOREIGN PATENT DOCUMENTS
JP    10-308979    11/1998
(Continued)

OTHER PUBLICATIONS
Taiwanese Office Action for Application No. 95141679, mailed on Mar. 5, 2010 (5 pages).
(Continued)

Primary Examiner — Chi Pham
Assistant Examiner — Fan Ng
(74) Attorney, Agent, or Firm — Osha • Liang LLP

(57) ABSTRACT

A control channel allocation apparatus includes a memory portion that stores an identifier indicating a layer 1 control channel associated with a downlink data channel, and a physical channel parameter for transmitting an uplink layer 1 control channel, the identifier being related to the physical channel parameter; a physical layer parameter determination portion that determines the physical channel parameter for transmitting the uplink layer 1 control channel in accordance with the identifier; a layer 1 control channel generation portion that generates a layer 1 control channel indicating a decoding result of a data channel, in accordance with the determined physical channel parameter; and a transmission portion that transmits the generated layer 1 control channel.

6 Claims, 12 Drawing Sheets

U.S. PATENT DOCUMENTS

2009/0271679 A1* 10/2009 Harada et al. .................. 714/748
2010/0027538 A1* 2/2010 Harada et al. .................. 370/389

FOREIGN PATENT DOCUMENTS

JP     2000-505613     5/2000
JP     2003-339073     11/2003

OTHER PUBLICATIONS

International Search Report (English and Japanese) for PCT/JP2006/322446 mailed Feb. 6, 2007 (9 pages).

Written Opinion of ISA (Japanese) for PCT/JP2006/322446 mailed Feb. 6, 2007 (3 pages).

3GPP TS 25.308 V6.3.0; Dec. 2006 3rd Generation Partnership Project; Technical Specification Group Radio Access Network; High Speed Downlink Packet Access (HSDPA); Overall description; Stage 2 (Release 6).

TSG-RAN Meeting #26, Dec. 2004, Athens, Greece; RP-040461, "Proposed Study Item on Evolved Utra and Utran" (5 pages).

European Search Report for Application No. 06832498.7 mailed Mar. 17, 2011 (14 pages).

Toskala A et al., "WCDMA for UMTS: Radio Access for Third Generation Mobile Communications, High-speed Downlink Packet Access"; XP-002513999, Sep. 1, 2004 (20 pages).

NTT DoCoMo et al., "CQI-based Transmission Power Control for Control Channel in Evolved UTRA Uplink"; TSG-RAN WG1 #43; R1-051393; Seoul, Korea, Nov. 7, 2005 (2 pages).

NTT DoCoMo "Physical Channels and Multiplexing in Evolved UTRA Uplink" 3GPP TSG RAN WG1 Ad Hoc on LTE; R1050591; Sophia Antipolis, France Jun. 20, 2005 (11 pages).

NTT DoCoMo et al., "CQI-based Transmission Power Control for Control Channel in Evolved UTRA" TSG-RAN WG1 #42bis; R1-051145 (Original R1-050852); San Diego, California, USA; Oct. 10, 2005 (3 pages).

NTT DoCoMo et al., "Multiplexing Method of Shared Control Channel in Uplink Single-Carrier FDMA Radio Access"; TSG-RAN WG1 #42bis; R1-051143 (Original R1-050591); San Diego, California, USA Oct. 10, 2005 (4 pages).

NTT DoCoMo et al., "Physical Channels and Multiplexing in Evolved UTRA Downlink", 3GPP TSG RAN WG1 #42 on LTE; R1-050707 (Original R1-050590); London, UK, Aug. 29, 2005 (8 pages).

* cited by examiner

FIG.7

| DOWNLINK ASSOCIATED CONTROL CHANNEL NUMBER | L1 CONTROL CHANNEL FOR TRANSMITTING ARQ FEEDBACK SIGNAL FREQUENCY BLOCK NUMBER |
|---|---|
| #1 | #1 |
| #2 | #2 |
| ... | ... |
| #i | #i |
| ... | ... |
| #N | #N |

FIG.11

| RESERVATION CHANNEL NUMBER | L1 CONTROL CHANNEL FOR TRANSMITTING ARQ FEEDBACK SIGNAL |
|---|---|
| | FREQUENCY BLOCK NUMBER |
| #1 | #1 |
| #2 | #2 |
| ... | ... |
| #i | #i |
| ... | ... |
| #N | #N |

CONTROL CHANNEL ALLOCATION APPARATUS, MOBILE COMMUNICATIONS SYSTEM, AND CONTROL CHANNEL ALLOCATION METHOD

TECHNICAL FIELD

The present invention relates to a control channel allocation apparatus, a mobile communications system, and a control channel allocation method.

BACKGROUND ART

As an example of a feedback channel for Automatic Repeat reQuest (ARQ), there has been a feedback channel employed in High Speed Downlink Packet Access (HSDPA) (see Non-patent Publication 2, for example).

In HSDPA, Code Division Multiplexing (CDM) is applied to High Speed Physical Downlink Shared Channel (HS-PD-SCH), which is a physical channel for transmitting traffic data, thereby enabling simultaneous data transmissions to plural mobile stations per Transmission Time Interval (TTI). Therefore, High Speed Dedicated Physical Control Channels (HS-DPCCH), which are control channels for sending back to a sender ACK/NACK information (an ARQ feedback signal) as a decoding result of a data channel transmitted through the HS-PDSCH, are also simultaneously sent back from the plural mobile stations.

The HS-DPCCH is a dedicated physical channel spread by a mobile station specific scramble code in order to recognize the ARQ feedback signals from corresponding plural mobile stations. Therefore, while the HS-DPCCH is allocated to a certain mobile station, a physical channel parameter such as the scramble code specifically for transmitting the ARQ feedback signal is not necessarily re-allocated, and information on the allocated physical channel is not required to be sent.

FIG. 1 shows an example of the HS-DPCCH, which is the physical channel for transmitting the ARQ feedback signal in HSDPA. In the HS-DPCCH, a set of control information is transmitted using three time slots. In addition, the HS-DPCCH is code-multiplexed with other physical channels in order to transmit the data channel and the like for an uplink transmission. The code-multiplexed signal sequence undergoes spreading using the user-specific scramble code, and is transmitted.

Non-patent Publication 1: 3GPP TS25.308
Non-patent Publication 2: 3GPP TSG-RAN#26 RP-040461

SUMMARY OF INVENTION

Problem to be Solved by the Invention

However, there are the following issues about the above related art.

Because Evolved UTRAN is a packet transmission specific system, packet transmission of information using a shared channel is primarily considered without relying on a dedicated channel (see Non-patent Publication 2, for example).

In addition, Frequency Division Multiplexing (FDM) where a channel band through which a data channel and a control channel are transmitted is divided into plural bands in a frequency domain, and the physical channels corresponding to the divided bands in the frequency domain are allocated to different mobile stations has been considered to be applied in Evolved UTRAN.

Furthermore, it has been considered that channel allocation (packet scheduling) that takes account of channel variations in the frequency domain may be applied when the physical channels are allocated to each of the divided bands. Therefore, the physical channel to a certain mobile station is dynamically varied with time.

In addition, application of Frequency Division Multiple Access (FDMA) as well as CDMA is under consideration in allocation of an uplink physical channel that sends the ARQ feedback signal. Therefore, the mobile station specific scramble code alone cannot designate the physical channel for transmitting the ARQ feedback signal.

Specifically, the physical channel is recognized in a clearly defined manner by determining a set of the physical channel parameters such as an identifier number belonging to a spreading code and a symbol position to which the control channel is allocated, in addition to a frequency block number that shows the divided band used to transmit the ARQ feedback signal. In addition, the physical channel parameter needs to be allocated per TTI, as is the case with the data channel.

However, when the base station (network) that carries out packet-scheduling determines physical channel mapping information regarding the ARQ feedback signal for each mobile station per TTI and sends the allocation information about the physical channel parameters, it becomes disadvantageous in that the control channel (the associated control channel) associated with the data channel has to have an increased amount of signals.

Even when the uplink data transmission is taken into consideration, the mobile station has to recognize a parameter of a physical channel on which the ARQ feedback signal transmitted through the downlink is mapped.

Because the scheduling needs to be carried out in the base station, the scheduling result regarding where the physical channel that transmits the ARQ feedback signal is mapped needs to be sent from the base station to each of the mobile stations, which is also disadvantageous in that the associated control channel (allocation channel) for sending the allocation information has to have an increased amount of signals, as is the case with the downlink data transmission.

The present invention has been made in view of the above, and is directed to a control channel allocation apparatus, a mobile station, a base station, and a control channel allocation method that are capable of sending a receiver the information on the physical channel parameters such as the frequency block to which the ARQ feedback signal is allocated, without increasing the amount of signals in the associated control channel.

Means for Solving the Problem

In order to eliminate the above disadvantages, a control channel allocation apparatus according to an embodiment of the present invention includes a memory portion that stores an identifier indicating a layer 1 control channel associated with a downlink data channel, and a physical channel parameter for transmitting an uplink layer 1 control channel, the identifier being related to the physical channel parameter; a physical layer parameter determination portion that determines the physical channel parameter for transmitting the uplink layer 1 control channel in accordance with the identifier; a layer 1 control channel generation portion that generates a layer 1 control channel indicating a decoding result of a data channel, in accordance with the determined physical channel parameter; and a transmission portion that transmits the generated layer 1 control channel.

With this configuration, the information on the physical channel parameters such as the frequency block to which the ARQ feedback signal is allocated can be sent to a receiver, without increasing the amount of signals in the associated control channel.

Another control channel allocation apparatus according to another embodiment of the present invention includes a memory portion that stores an identifier indicating a reservation channel to be used in transmitting an uplink data channel, and a physical channel parameter for transmitting a downlink layer 1 control channel, the identifier being related to the physical channel parameter; a physical layer parameter determination portion that determines the physical channel parameter for transmitting the downlink layer 1 control channel in accordance with the identifier; a layer 1 control channel generation portion that generates a layer 1 control channel indicating a coding result of the data channel in accordance with the determined physical channel parameter; and a transmission portion that transmits the generated layer 1 control channel.

With such a configuration, the information on the physical channel parameters such as the frequency block to which the ARQ feedback signal is allocated can be sent to a receiver, without increasing the amount of signals in the associated control channel (allocation channel).

Additionally, a mobile communications system according to another embodiment of the present invention includes a mobile station and a base station. The mobile station includes a memory portion that stores an identifier indicating a layer 1 control channel associated with a downlink data channel, and a physical channel parameter for transmitting an uplink layer 1 control channel, the identifier being related to the parameter; a physical layer parameter determination portion that determines the physical channel parameter for transmitting the uplink layer 1 control channel in accordance with the identifier; a layer 1 control channel generation portion that generates a layer 1 control channel indicating a decoding result of a data channel in accordance with the determined physical channel parameter; and a transmission portion that transmits the generated layer 1 control channel. The base station includes a memory portion that stores the identifier indicating the layer 1 control channel associated with the downlink data channel; an associated control channel generation portion that generates an associated control channel for reporting allocation of transmission opportunity to the downlink data channel; and a reception portion that receives the uplink layer 1 control channel corresponding to the associated control channel.

With such a configuration, the information on the physical channel parameters such as the frequency block to which the ARQ feedback signal is allocated can be sent to a receiver, i.e., a mobile station, without increasing the amount of signals in the associated control channel.

Another mobile communications system according to another embodiment of the present invention includes a mobile station and a base station. The mobile station includes a memory portion that stores an identifier indicating a reservation channel to be used in transmitting an uplink data channel, and a physical channel parameter for transmitting a downlink layer 1 control channel, the identifier being related to the physical channel parameter; a reservation channel generation portion that generates a reservation channel; and a reception portion that receives the downlink layer 1 control channel corresponding to the reservation channel. The base station includes a memory portion that stores the identifier indicating the reservation channel to be used in transmitting the uplink data channel, and the physical channel parameter for transmitting the downlink layer 1 control channel, the identifier being related to the physical channel parameter; a physical layer parameter determination portion that determines the physical channel parameter for transmitting the downlink layer 1 control channel; a layer 1 control channel generation portion that generates a layer 1 control channel indicating a decoding result of a data channel, in accordance with the determined physical channel parameter; and a transmission portion that transmits the generated layer 1 control channel.

With such a configuration, the information on the physical channel parameters such as the frequency block to which the ARQ feedback signal is allocated can be sent to a sender, i.e., a mobile station, without increasing the amount of signals in the associated control channel (allocation channel).

In addition, a control channel allocation method according to another embodiment of the present invention includes a reception step of receiving a layer 1 control channel associated with a downlink data channel; a physical layer parameter determination step of determining a physical channel parameter corresponding to an identifier indicating a layer 1 control channel, in accordance with the identifier indicating the layer 1 control channel associated with the downlink data channel, and the physical channel parameter for transmitting the layer 1 control channel, the identifier being related to the physical channel parameter in advance; a layer 1 control channel generation step of generating the layer 1 control channel indicating a decoding result of a data channel in accordance with the determined physical channel parameter; and a transmission step of transmitting the generated layer 1 control channel.

With this, the information on the physical channel parameters such as the frequency block to which the ARQ feedback signal is allocated can be sent to a receiver, without increasing the amount of signals in the associated control channel.

Another control channel allocation method according to another embodiment of the present invention includes a reception step of receiving a reservation channel to be used in transmitting an uplink data channel; a physical layer parameter determination step of determining a physical channel parameter corresponding to an identifier indicating the reservation channel, in accordance with the identifier indicating the reservation channel to be used in transmitting the uplink data channel, and the physical channel parameter for transmitting the downlink layer 1 control channel, the identifier being related to the physical layer parameter in advance; a layer 1 control channel generation step of generating a layer 1 control channel indicating a decoding result of a data channel, in accordance with the determined physical channel parameter; a layer 1 control channel generation step of generating a layer 1 control channel indicating a decoding result of the data channel, in accordance with the determined physical channel parameter; and a transmission step of transmitting the generated layer 1 control channel.

With this, the information on the physical channel parameters such as the frequency block to which the ARQ feedback signal is allocated can be sent to a sender, without increasing the amount of signals in the associated control channel (allocation channel).

ADVANTAGE OF THE INVENTION

According to examples of the present invention, there is provided a control channel allocation apparatus, a mobile communications system, and a control channel allocation method that are capable of sending a receiver the information on the physical channel parameters such as the frequency block to which the ARQ feedback signal is allocated, without increasing the amount of signals in the associated control channel.

BRIEF DESCRIPTION OF THE DRAWINGS

FIG. 7 is an explanatory view showing an example of allocating the layer 1 control channel for transmitting the ARQ feedback signal in downlink transmission.

FIG. 11 is an explanatory diagram showing an example of allocating the layer 1 control channel for transmitting the ARQ feedback signal in uplink transmission.

LIST OF REFERENCE SYMBOLS

100: base station
200: mobile station

BEST MODE FOR CARRYING OUT THE INVENTION

Next, examples according to the present invention are described referring to the accompanying drawings. In all the drawings for explaining the examples, the same reference marks are given to elements having the same functions, and repeated explanations are omitted.

Figure 1:
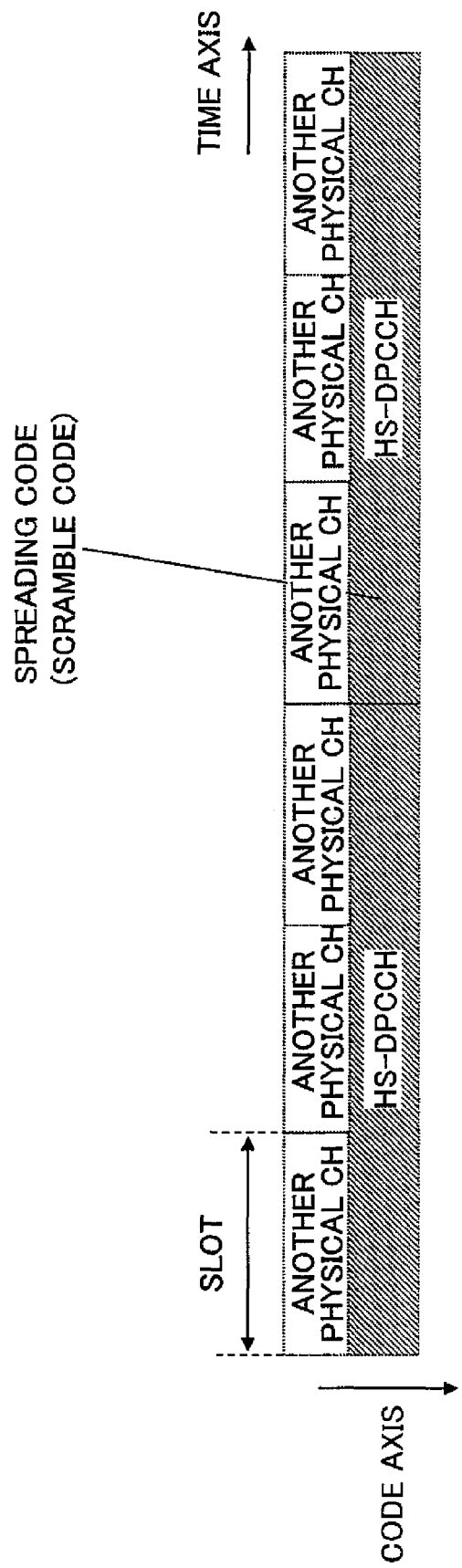
FIG. 1 is an explanatory diagram showing an example of a physical channel parameter in a layer 1 control channel allocation.
Figure 2:
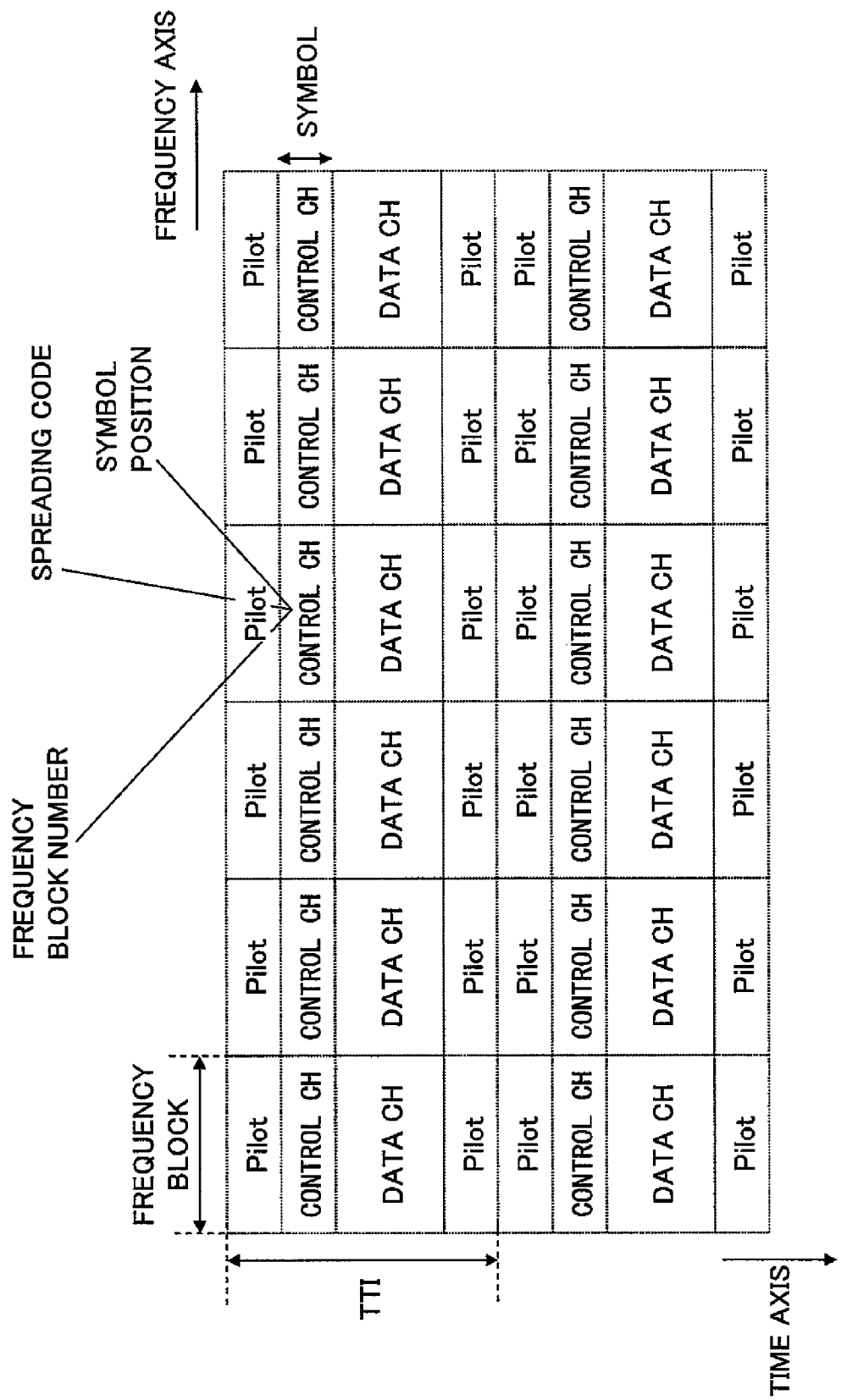
FIG. 2 is another explanatory diagram showing an example of a physical channel parameter in a layer 1 control channel allocation.
Figure 3:
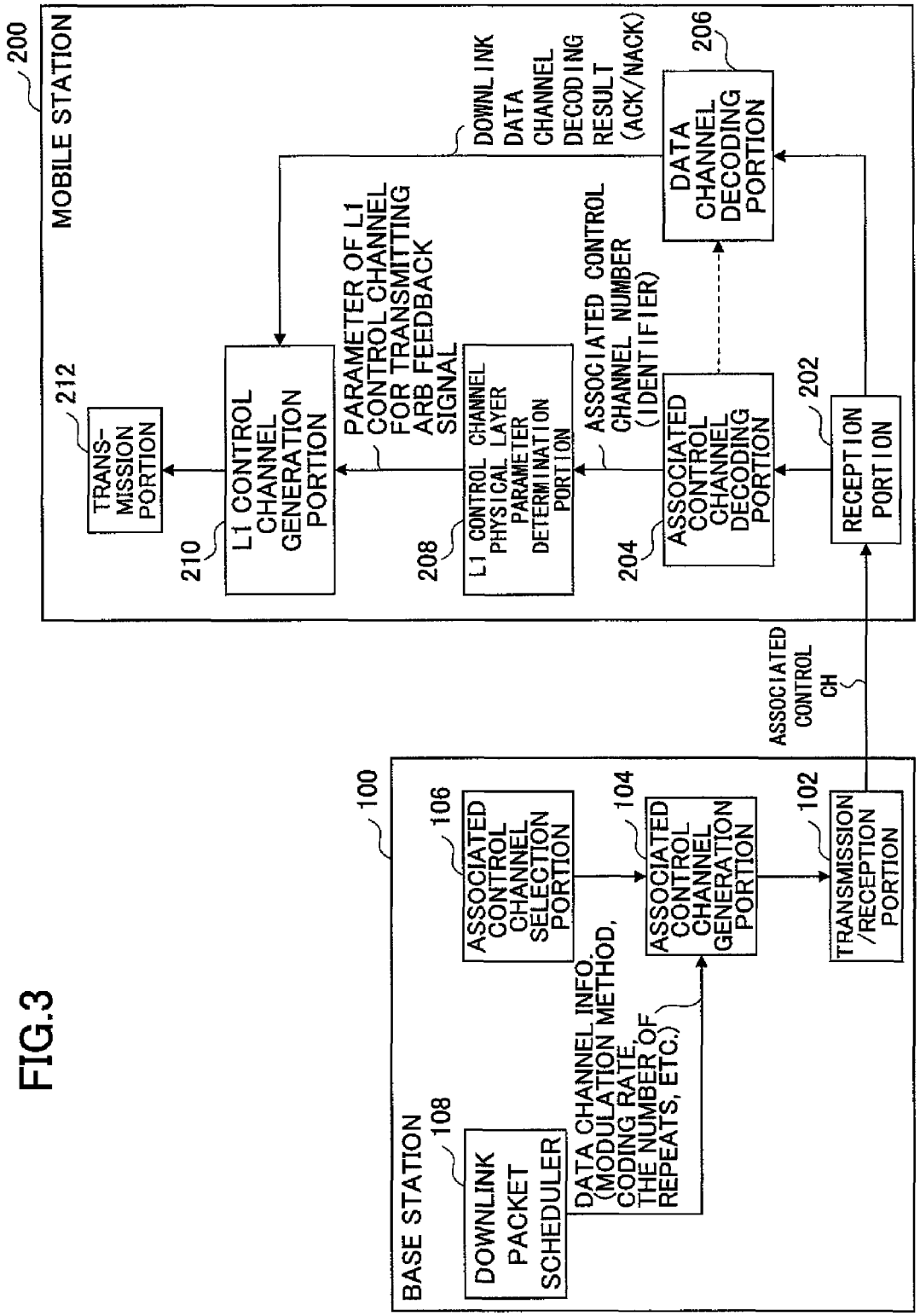
FIG. 3 is a block diagram showing a communications system according to one embodiment of the present invention.

Referring to FIG. 3, a mobile communications system according to one example of the present invention is described.

The mobile communications system according to this example includes a base station 100 and a mobile station 200. First, a downlink transmission is explained. In the mobile communications system according to this example, a (layer 1) control channel for transmitting an ARQ feedback signal in a downlink transmission is allocated.

The base station 100 in this example is explained.

The base station 100 includes a transmission/reception portion 102, an associated control channel generation portion 104 that is connected to the transmission/reception portion 102 and serves as a memory and an associated control channel generator, an associated control channel selection portion 106 connected to the associated control channel generation portion 104, and a downlink packet scheduler 108.

The downlink packet scheduler 108 allocates a transmission opportunity for data to be sent to each user, namely a downlink data channel. In addition, the downlink packet scheduler 108 sends to each user of the allocated data channel by outputting data channel information to the associated control channel generation portion 104. For example, the downlink packet scheduler 108 determines physical layer parameters of the data channel such as a data modulation method, a channel coding factor, and a frequency block to be used, the number of transmissions, and the like, as the data channel information.

The associated control channel selection portion 106 selects an associated control channel for sending the transmission opportunity allocation in accordance with the plural physical layer parameters in the associated control channel that can be used by a certain user.

The associated control channel generation portion 104 stores an identifier indicating a layer 1 control channel (referred to as an associated control channel, hereinafter) associated with the downlink data channel, and the physical channel parameter for transmitting an uplink layer 1 control channel, the identifier being related to the physical channel parameter, and maps the data channel physical layer parameter provided by the downlink packet scheduler 108 onto the associated control channel selected by the associated control channel selection portion 106 so as to be output to the transmission portion 102. Additionally, the associated control channel generation portion 104 outputs the information on the physical channel parameter for transmitting the uplink layer 1 control channel corresponding to the associated control channel to the transmission/reception portion 102.

The transmission/reception portion 102 transmits the generated associated control channel to the mobile station 200. Additionally, the transmission/reception portion 102 receives the uplink layer 1 control channel corresponding to the transmitted associated control channel. For example, the transmission/reception portion 102 goes into a waiting state based on the physical channel parameter of the uplink layer 1 control channel corresponding to the transmitted associated control channel.

Next, the mobile station 200 in this example is described.

The mobile station 200 includes a reception portion 202, an associated control channel decoding portion 204 connected to the reception portion 202, a data channel decoding portion 206 connected to the reception portion 202, an L1 control channel physical parameter determination portion 208 that is connected to the associated control channel decoding portion 204 and serves as a physical layer parameter determiner, an L1 control channel generation portion 210 that is connected to the L1 control channel physical layer parameter determination portion 208 and the data channel decoding portion 206 and serves as a memory and a layer 1 control channel generator, and a transmission portion 212 connected to the L1 control channel generation portion 210. In addition, the L1 control channel physical layer parameter determination portion 208 and the L1 control channel generation portion 210 constitute a control channel allocation device.

The reception portion 202 receives the associated control channel transmitted by the base station 100, decodes the received associated control channel, and outputs the decoded associated control channel to the associated control channel decoding portion 204. In addition, the reception portion 202 receives the data channel, decodes the received data channel, and outputs the decoded data channel to the data channel decoding portion 206.

The associated control channel decoding portion 204 decodes the associated control channel. For example, the associated control channel decoding portion 204 decodes the associated control channel and outputs an identifier indicating the decoded associated control channel, for example, a number indicating the associated control channel to the L1 control channel physical layer parameter determination portion 208.

The L1 control channel physical layer parameter determination portion 208 stores the identifier indicating the layer 1 control channel associated with the downlink data channel, and the physical channel parameter for transmitting the uplink layer 1 control channel, the identifier being related to the physical channel parameter, and determines, in accordance with the input identifier of the associated control channel, the corresponding L1 control channel physical layer parameter for transmitting the ARQ feedback signal, namely the physical channel parameter for transmitting the uplink L1 control channel on which the ARQ feedback signal is mapped.

For example, the L1 control channel physical layer parameter determination portion 208 stores a number belonging to the layer 1 control channel associated with the downlink data channel and a number belonging to the frequency block for transmitting the layer 1 control channel, which are associated with each other, determines the number belonging to the frequency block for transmitting the L1 control channel for the ARQ feedback signal in accordance with the number indicating the associated control channel, and outputs the number to the L1 control channel generation portion 210.

The data channel decoding portion 206 decodes the data channel and outputs information indicating the downlink data channel decoding result to the L1 control channel generation portion 210. For example, the data channel decoding portion 206 outputs ACK/NACK as the information indicating the downlink data channel decoding result to the L1 control channel generation portion 210. In addition, the data channel decoding portion 206 generates the ARQ feedback signal and sends the ARQ feedback signal to the L1 control channel generation portion 210.

The L1 control channel generation portion 210 uses the L1 control channel physical layer parameter for transmitting the ARQ feedback signal, the parameter having been input from the L1 control channel physical layer parameter determination portion 208, so as to generate the L1 control channel for transmitting the ARQ feedback signal, and outputs the L1 control channel for transmitting the ARQ feedback signal to the transmission portion 212.

The transmission portion 212 transmits the L1 control channel for transmitting the ARQ feedback signal to the base station 100.

Figure 4:
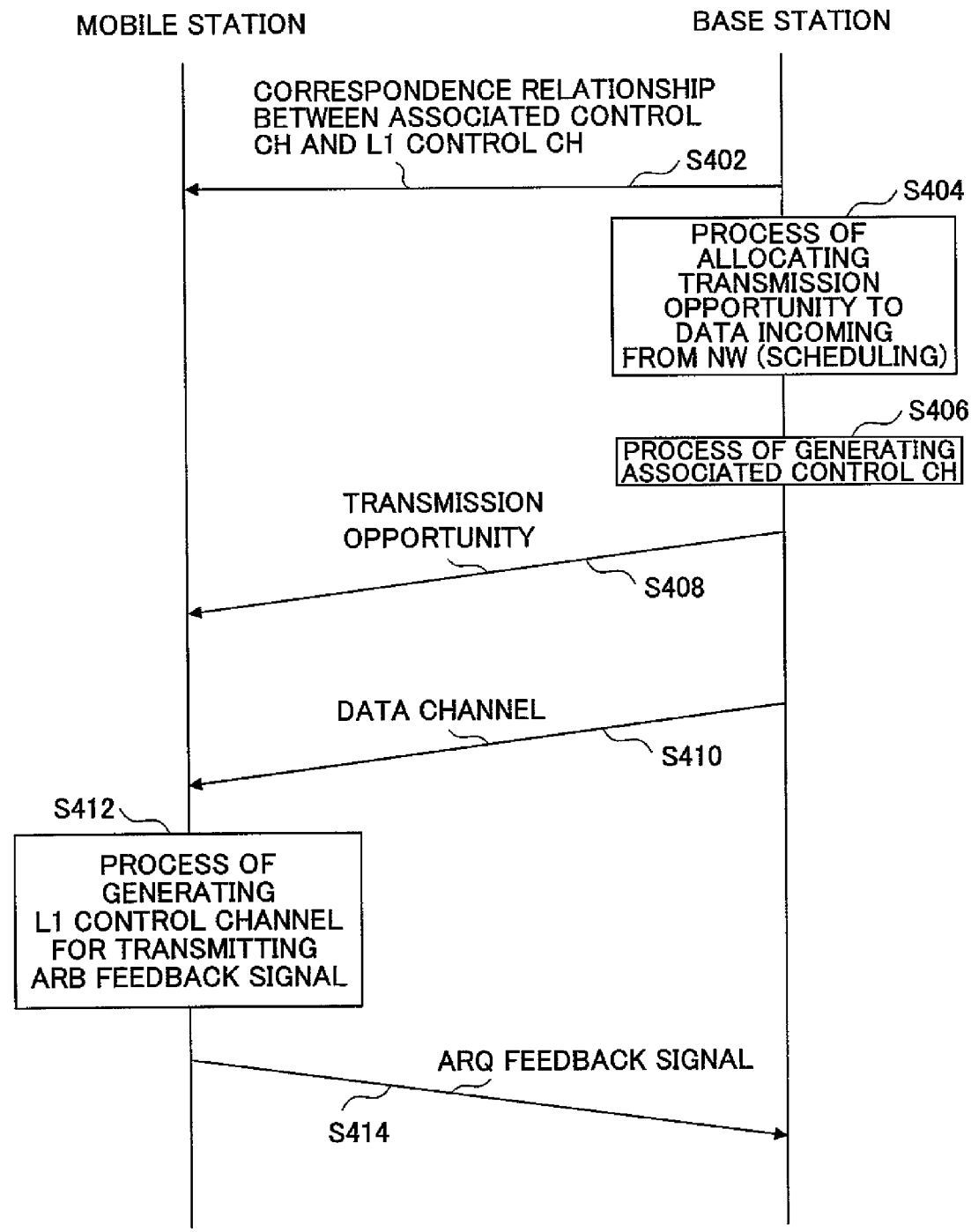
FIG. 4 is a flow diagram showing a process of allocating a layer 1 control channel for transmitting an ARQ feedback signal in downlink transmission.

Next, an example of allocation of the L1 control channel for transmitting the ARQ feedback signal is described in reference to FIG. 4.

Before starting communications, the base station 100 and the mobile station 200 carry out a process so as to share the same corresponding relationship between the associated control channel and the L1 control channel parameter for transmitting the ARQ feedback signal (step S402). This process is carried out through notification from a network to the mobile station 200. Alternatively, the process may be carried out when the base station 100 and the mobile station 200 obtain the corresponding relationship in advance. This corresponding relationship between the associated control channel and the L1 control channel parameter for transmitting the ARQ feedback is stored in the associated control channel generation portion 104 and the L1 control channel physical layer parameter determination portion 208.

A transmission opportunity is allocated to transmission data incoming from the network by the downlink packet scheduler 108, and the data channel information is input to the associated control channel generation portion 104 (step S404). In addition, the associated control channel for sending the transmission opportunity allocation is selected by the associated control channel selection portion 106, and input to the associated control channel generation portion 104. The associated control channel generation portion 104 generates the associated control channel (step S406), and sends the information on the transmission opportunity allocation to the mobile station (step S408).

Next, the transmission/reception 102 of the base station 100 transmits the data channel (step S410). Then, the transmission/reception portion 102 of the base station 100 goes into a waiting state for the uplink layer 1 control channel in accordance with the physical channel parameter of the uplink layer 1 control channel corresponding to the transmitted associated control channel.

The reception portion 202 of the mobile station 200 receives the associated control channel and the data channel. The L1 control channel generation portion 210 carries out a generation process of the L1 control channel for transmitting the ARQ feedback signal, which is a decoding result of the data channel (step S412), and transmits the ARQ feedback signal to the base station 100 (step S414).

Figure 5:
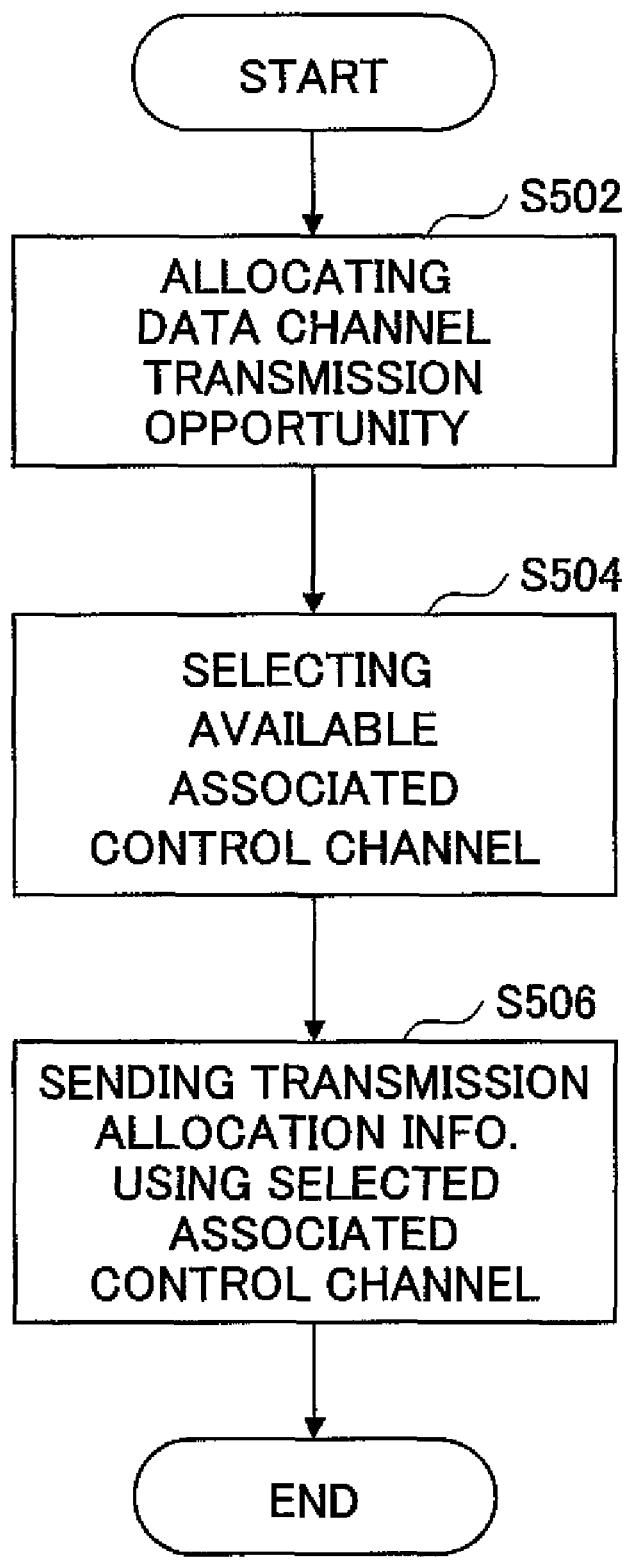
FIG. 5 is a flow chart showing a process of generating an associated control channel in downlink transmission.

Referring to FIG. 5, a process for generating the associated control channel is explained in detail.

The downlink packet scheduler 108 allocates a transmission opportunity to a data channel and outputs information on the allocated data channel to the associated control channel generation portion 104 (step S502). Next, the associated control channel selection portion 106 selects an associated control channel from available associated control channels, and outputs information indicating the selected associated control channel to the associated control channel generation portion 104 (step S504). The associated control channel generation portion 104 maps the information on the transmission allocation of the data to the pertinent mobile station 200 onto the selected associated control channel, and then transmits the mapped associated control channel (step S506). Then, the transmission/reception portion 102 of the base station 100 goes into a waiting state for the uplink layer 1 control channel in accordance with the physical channel parameter of the uplink layer 1 control channel corresponding to the transmitted associated control channel.

Figure 6:
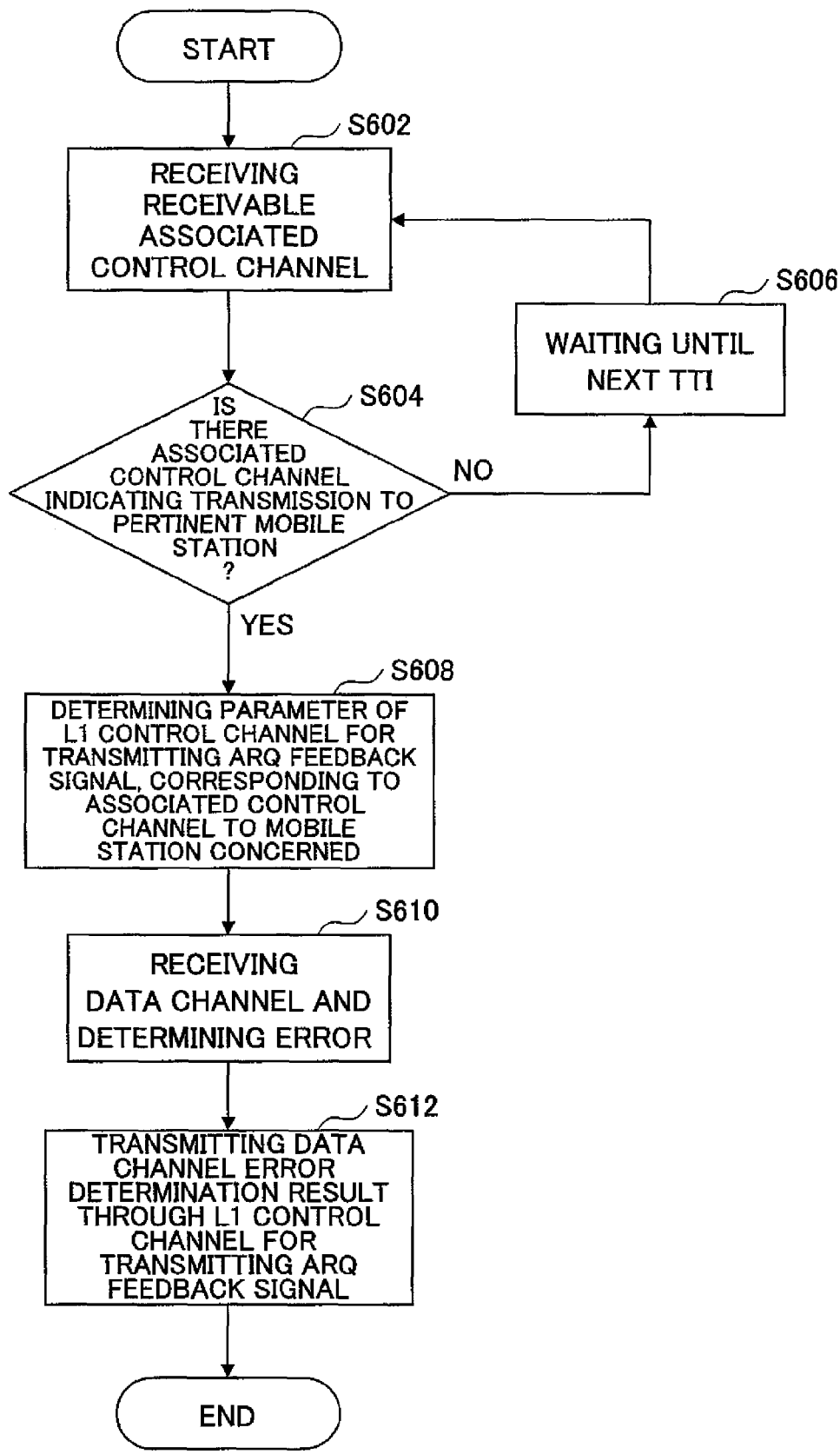
FIG. 6 is a flow chart showing a process of generating the layer 1 control channel for transmitting an ARQ feedback signal in downlink transmission.

Next, a process for generating the L1 control channel for transmitting the ARQ feedback signal is described in detail in reference to FIG. 6.

The mobile station 200 receives at the reception portion 202 the associated control channel (step S602). The received associated control channel is input to the associated control channel decoding portion 204. The associated control channel decoding portion 204 decodes the associated control channel, and confirms whether the transmission opportunity is allocated to the data for the same mobile station 200 (step S604).

When the transmission opportunity is not allocated to the data for the same mobile station 200 (step S604: NO), the mobile station 200 waits until the next TTI (step S606). On the other hand, when the transmission opportunity is allocated to the data for the same mobile station 200 (step S604: YES), the L1 control channel physical layer parameter determination portion 208 determines the L1 control channel parameter for transmitting the ARQ feedback signal in accordance with the corresponding relationship between the associated control channel and the L1 control channel parameter for transmitting the ARQ feedback signal (step S608).

In the corresponding relationship between the associated control channel and the L1 control channel parameter for transmitting the ARQ feedback signal, a downlink associated control channel number (a number belonging to the layer 1 control channel associated with the downlink data channel) and a frequency block number belonging to the L1 control channel for transmitting the ARQ feedback signal are associated with each other, for example, as shown in FIG. 7. The L1 control channel physical layer parameter determination portion 208 determines the L1 control channel for transmitting the ARQ feedback signal, for example, the frequency block number, in accordance with the identifier indicating the associated control channel, for example, the number indicating the associated control channel.

In this example, the L1 control channel for transmitting the ARQ feedback signal is allocated to a specific one symbol of a frame to be transmitted in 1 TTI, and code-multiplexing is not carried out. However, the L1 control channel for transmitting the ARQ feedback signal may be allocated to plural symbols of frames to be transmitted in 1 TTI, and code-multiplexing may be carried out.

In addition, the number of the selectable associated control channels and the number of the sets of the physical layer parameters such as the frequency blocks usable for the L1 control channel for transmitting the ARQ feedback are the same as N, in this example. However, the process explained here is applicable even when the number of the selectable associated control channels is different from the number of the sets of the physical layer parameters such as the frequency blocks usable for the L1 control channel for transmitting the ARQ feedback.

When the transmission opportunity is allocated by the base station 100 in accordance with the identifier indicating the associated control channel, for example, a number i, the corresponding i-th frequency block is determined to be the L1 control channel parameter for transmitting the ARQ feedback signal.

Next, the reception portion 202 receives the data channel after the associated control channel, demodulates the received data channel, and outputs the demodulated data channel to the data channel decoding portion 206. The data channel decoding portion 206 carries out error determination on the demodulated data channel (step S610), and outputs the decoding result to the L1 control channel generation portion 210.

Next, the L1 control channel generation portion 210 uses the result of the error determination carried out on the data channel so as to generate the L1 control channel for transmitting the ARQ feedback signal, and transmits the generated L1 control channel through the transmission portion 212 (step S612).

In such a manner, it becomes possible to inform the mobile station of the physical layer parameter selected from the plural L1 control channels for transmitting the ARQ feedback signal without increasing the amount of signals in the associated control channel in the downlink.

In this case, when there are N selectable L1 control channels for transmitting the ARQ feedback signal, the signal can be reduced $\log_2(N)$ bits per 1 TTI per one ARQ connection.

Although the associated control channel whose number is the same as the number belonging to the frequency block allocated to the L1 control channel for transmitting the ARQ feedback signal is used in this example, the corresponding relationship may be determined using a predetermined function known to the base station and the mobile station in order to relate the number allocated to the frequency block to the number allocated to the associated control channel on a one-to-one basis.

Figure 8:
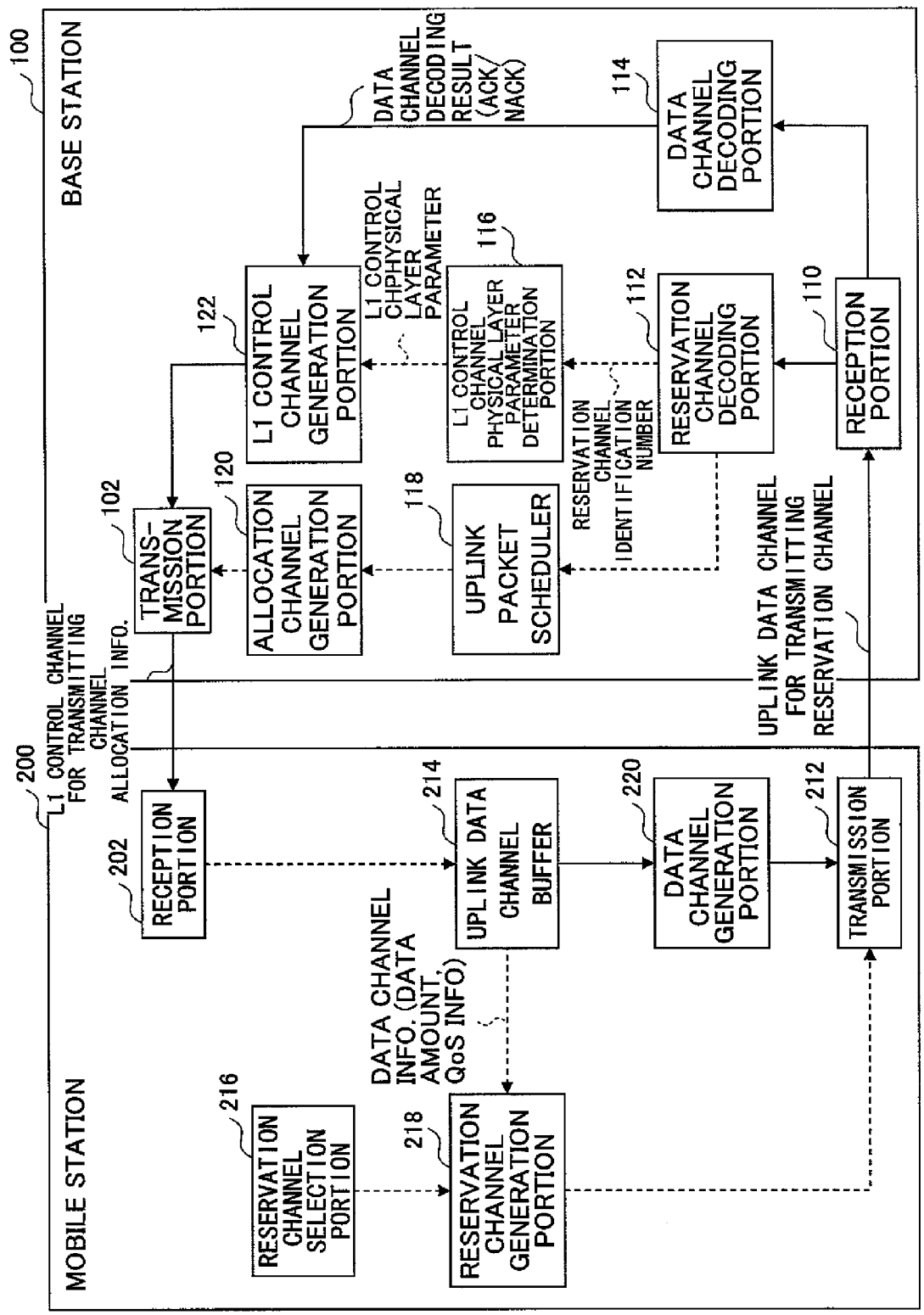
FIG. 8 is a block diagram showing a communications system according to another embodiment of the present invention.

Next, the uplink transmission is explained in reference to FIG. 8. In the mobile communications system according to this example, the L1 control channel for transmitting the ARQ feedback signal is allocated.

The mobile station 200 in this example includes the reception portion 202, an uplink data channel buffer 214 connected to the reception portion 202, a reservation channel selection portion 216, a reservation channel generation portion 218 that is connected to the reservation channel selection portion 216 and the uplink data channel buffer 214 and serves as a memory and a reservation channel generator, a data channel generation portion 220 connected to the uplink data channel buffer 214, and the transmission portion 212 connected to the data channel generation portion 220 and the reservation channel generation portion 218.

The reservation channel selection portion 216 selects a physical layer parameter of a reservation channel for transmitting reservation information, which is a physical channel allocation request when transmitting uplink data, from selectable candidates, and outputs the information to the reservation channel generation portion 218. The reservation information includes the amount of data to be transmitted, information on Quality of Service (QoS) required for the data, transmission power in the mobile station, and the like.

The reservation channel generation portion 218 stores an identifier indicating the reservation channel to be used when transmitting the uplink data channel, and the physical channel parameter for transmitting the downlink layer 1 control channel, the identifier being related to the physical channel parameter, generates the reservation information in accordance with the capacity of the uplink data channel buffer 214 and/or QoS categories of a buffered packet, maps the reservation information onto the reservation channel, and outputs the reservation channel to the transmission portion 212. In addition, the reservation channel generation portion 218 sends information indicating the physical channel parameter of the downlink layer 1 control channel corresponding to the reservation channel to the reception portion 202.

The uplink data channel buffer 214 buffers user data, and sends to the reservation channel generation portion 218 information necessary for generating the reservation channel as data channel information. The data channel information includes the amount of data, QoS information, and the like.

The data channel generation portion 220 retrieves transmission data from the uplink data channel buffer 214, generates the data channel, and outputs the data channel to the transmission portion 212, in accordance with the channel allocation by the base station 100 in response to a channel allocation request through the reservation channel.

The transmission portion 212 transmits the reservation channel and/or the data channel.

The reception portion 202 goes into a waiting state for the L1 control channel to be transmitted from the base station 100 in accordance with the information indicating the physical channel parameter of the downlink layer 1 control channel sent from the reservation channel generation portion 218.

The base station in this example includes a reception portion 110, a reservation channel decoding portion 112 connected to the reception portion 110, a data channel decoding portion 114 connected to the reception portion 112, an L1 control channel physical layer parameter determination portion 116 that is connected to the reservation channel decoding portion 112 and serves as a memory and a physical layer parameter determiner, an uplink packet scheduler 118 connected to the reservation channel decoding portion 112, an allocation channel generation portion 120 connected to the uplink packet scheduler 118, an L1 control channel generation portion 122 connected to the L1 control channel physical layer parameter determination portion 116 and the data channel decoding portion 114, and a transmission portion 102 connected to the allocation channel generation portion 120 and the L1 control channel generation portion 122. In addition, the L1 control channel physical layer parameter determination portion 116 and the L1 control channel generation portion 122 constitute a control channel allocation apparatus.

The reception portion 110 receives and demodulates the reservation channel and the uplink data channel, and outputs the modulated reservation channel and the modulated data channel to the reservation channel decoding portion 112 and the data channel decoding portion 114, respectively.

The reservation channel decoding portion 112 decodes the reservation channel and sends the decoding result to the uplink packet scheduler 118, and sends the identifier indicating the reservation channel, for example, the identification number to the L1 control channel physical layer parameter determination portion 116.

The uplink packet scheduler 118 determines whether a transmission opportunity is allocated in the uplink data channel, and outputs the result to the allocation channel generation portion 120.

The allocation channel generation portion 120 generates an allocation channel in accordance with the allocation of the transmission opportunity in the uplink data channel by the uplink packet scheduler 118, and outputs the allocation channel to the transmission portion 102.

The L1 control channel physical layer parameter determination portion 116 stores the identifier indicating the reservation channel to be used when transmitting the uplink data channel, and the physical channel parameter for transmitting the downlink layer 1 control channel, the identifier being related to the physical channel parameter, and selects the physical layer parameter of the L1 control channel for transmitting the ARQ feedback signal, namely the physical layer parameter for transmitting the downlink control channel on which the ARQ feedback signal is mapped, in accordance with the input identifier indicating the reservation channel, which corresponds to the physical layer parameter on a one-to-one basis.

For example, the L1 control channel physical layer parameter determination portion 116 stores a number belonging to the reservation channel to be used when transmitting the uplink data channel and a number belonging to the frequency block for transmitting the downlink layer 1 control channel, the numbers being related to each other, and determines the frequency block for transmitting the downlink L1 control channel on which the retransmission request feedback signal is mapped, the frequency block corresponding to the reservation channel on a one-to-one basis.

The data channel decoding portion 114 decodes the uplink data channel, and sends the decoding result (the ARQ feedback signal) to the L1 control channel generation portion 122.

The L1 control channel generation portion 122 maps the ARQ feedback signal input from the data channel decoding portion 114 onto the L1 control channel determined by the L1 control channel physical layer parameter determination portion 116, and outputs the mapped channel to the transmission portion 102.

The transmission portion 102 transmits the L1 control channel for transmitting the ARQ feedback signal and the allocation channel. As a result, the result of the allocation of the transmission opportunity to the data channel and the ARQ feedback signal is sent to the mobile station 200.

Figure 9:
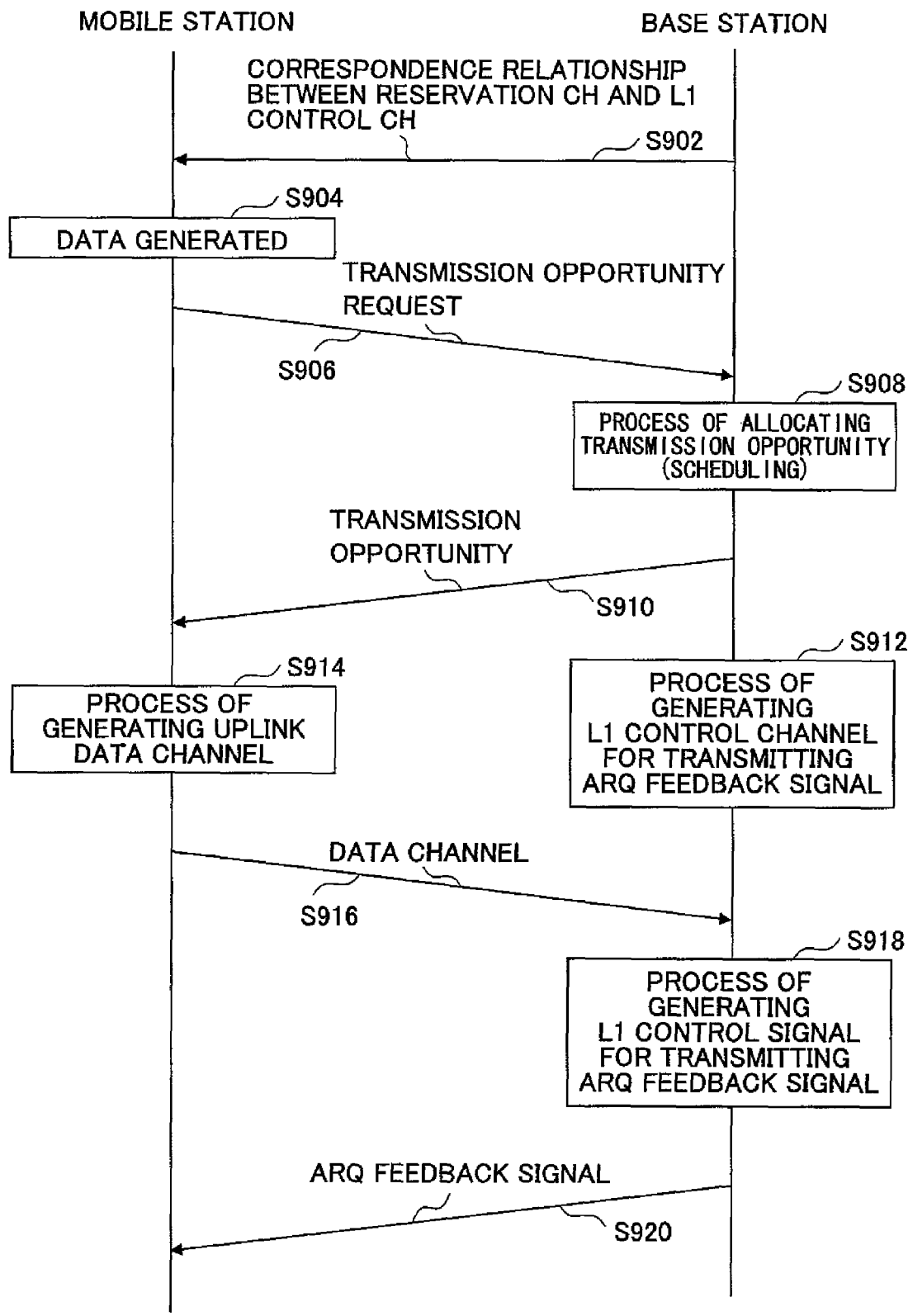
FIG. 9 is a flow diagram showing a process of transmitting a data channel in uplink transmission.

Next, an example of allocation of the L1 control channel parameter for transmitting the ARQ feedback signal in the uplink transmission is explained in reference to FIG. 9.

Before starting communications, the base station 100 and the mobile station 200 carry out a process in order to share the same corresponding relationship between the reservation channel and the L1 control channel parameter for transmitting the ARQ feedback signal (step S902). This process is carried out through notification from a network to the mobile station 200. Alternatively, the process may be carried out when the base station 100 and the mobile station 200 obtain the corresponding relationship in advance. This corresponding relationship between the reservation channel and the L1 control channel parameter for transmitting the ARQ feedback is stored in the reservation channel generation portion 218 and the L1 control channel physical layer parameter determination portion 116.

When data to be transmitted through the uplink are generated (step S904), the mobile station 200 makes a request for allocation of the transmission opportunity using the reservation channel (step S906).

For example, the reservation channel generation portion 218 generates reservation information in accordance with the capacity of the uplink data channel buffer 214 and/or QoS categories of the buffered packet, maps the reservation information onto the reservation channel selected by the reservation channel selection portion 216, and outputs the mapped reservation channel to the transmission portion 212. As a result, the allocation request for the transmission opportunity is transmitted to the base station 100 using the reservation channel.

Then, the reception portion 202 goes into a waiting state for the L1 control channel to be transmitted by the base station 100 in accordance with the information indicating the physical channel parameter of the downlink layer 1 control channel, the information having been sent from the reservation generation portion 218.

Next, when receiving the reservation channel, the uplink packet scheduler 118 in the base station 100 allocates the transmission opportunity for the mobile station 200 (step S908). For example, the allocation channel generation portion 120 generates the allocation channel in accordance with the allocation of the transmission opportunity of the uplink data channel by the uplink packet scheduler 118.

Next, the transmission portion 102 of the base station 100 sends the allocation result of the data channel transmission opportunity to the mobile station 200 through the allocation channel (step S910).

Then, the base station 100 prepares for data channel reception and allocates the L1 control channel for transmitting the ARQ feedback signal (step S912).

The mobile station 200 generates the uplink data channel (step S914), and transmits the data channel (step S916).

When receiving the data channel from the mobile station 200, the base station 100 generates the ARQ feedback signal, which is a result of data channel decoding, (step S918), and transmits the ARQ feedback signal to the mobile station 200 (step S920).

Figure 10:
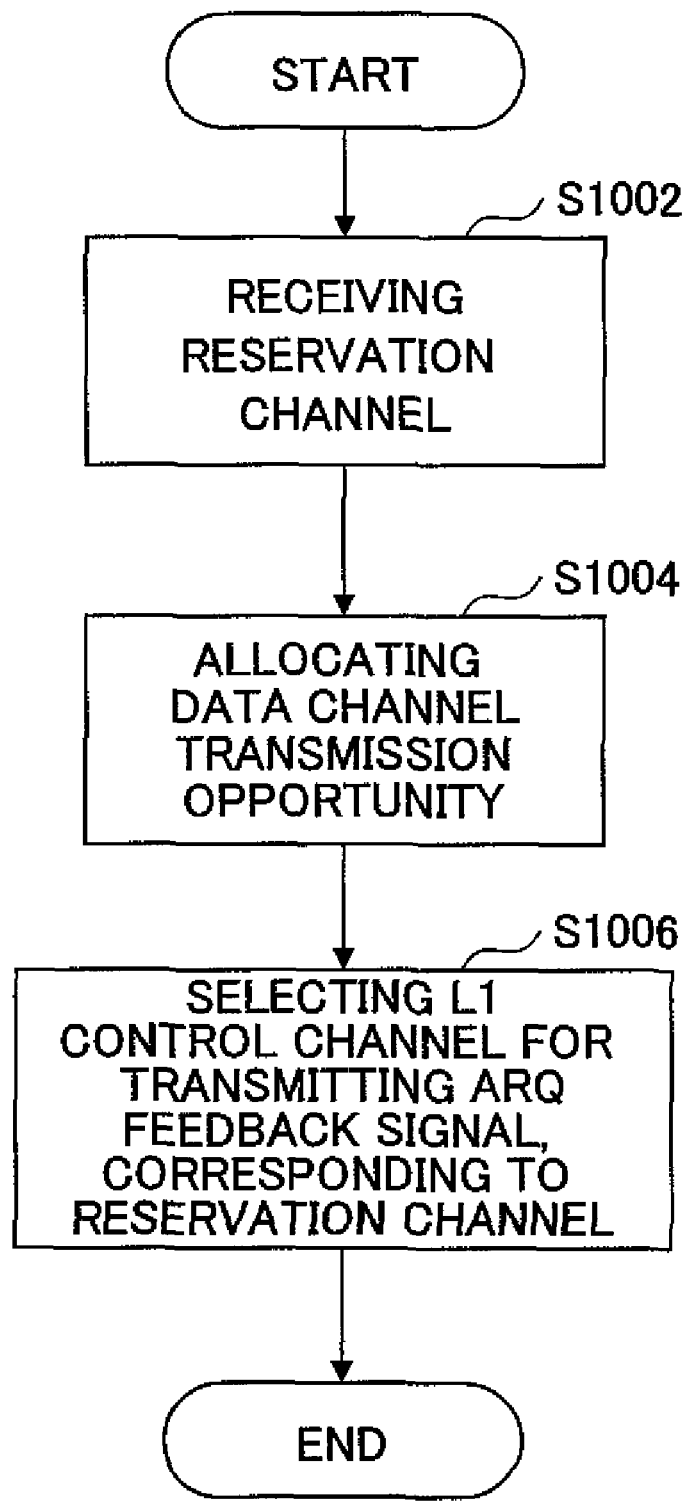
FIG. 10 is a flow chart showing a process of allocating a layer 1 control channel for transmitting an ARQ feedback signal in uplink transmission.

Next, allocation of the L1 control channel for transmitting the ARQ feedback signal is explained in reference to FIG. 10.

The reservation channel transmitted from the mobile station 200 is received by the base station 100 (step S1002). The reservation channel decoding portion 112 decodes the reservation channel. The uplink packet scheduler 118 allocates the transmission opportunity to the data channel in accordance with the decoded reservation channel (step S1004).

Then, the base station 100 selects the L1 control channel for transmitting the ARQ feedback signal, which corresponds to the reservation channel (step S1006). For example, the L1 control channel physical layer parameter determination portion 116 confirms the identifier allocated to the reservation channel, and determines the L1 control channel parameter for transmitting the ARQ feedback signal in accordance with the corresponding relationship between the reservation channel and the L1 control channel parameter for transmitting the ARQ feedback signal, when allocating the transmission opportunity to the reservation channel.

In the corresponding relationship between the reservation channel and the L1 control channel parameter for transmitting the ARQ feedback signal, a reservation channel number is related to a frequency block number of the L1 control channel for transmitting the ARQ feedback signal, for example, as shown in FIG. 11.

In this example, the L1 control channel for transmitting the ARQ feedback signal is allocated to a specific one symbol of a frame to be transmitted in 1 TTI, and code-multiplexing is not carried out. However, the L1 control channel for transmitting the ARQ feedback signal may be allocated to plural symbols of frames to be transmitted in 1 TTI, and code-multiplexing may be carried out.

In addition, the number of the reservation channels that may be sent and the number of the sets of the physical layer parameters such as the frequency blocks usable for the L1 control channel for transmitting the ARQ feedback are the same as N, in this example. However, the process explained here is applicable even when the number of the selectable associated control channels is different from the number of the sets of the physical layer parameters such as the frequency block usable for the L1 control channel for transmitting the ARQ feedback.

When the reservation information is transmitted using the identifier indicating the reservation channel, for example, a number i by the mobile station 200, the i-th frequency block is determined to be the L1 control channel parameter for transmitting the ARQ feedback signal. The information indicating the determined L1 control channel parameter is sent to the L1 control channel generation portion 122.

Since the mobile station 200 recognizes in advance which radio parameter is used to transmit the ARQ feedback channel signal by the base station 100, the mobile station 200 can receive the corresponding L1 control channel for transmitting the ARQ feedback channel without receiving information on the radio parameter to be used, from the base station 100.

Figure 12:
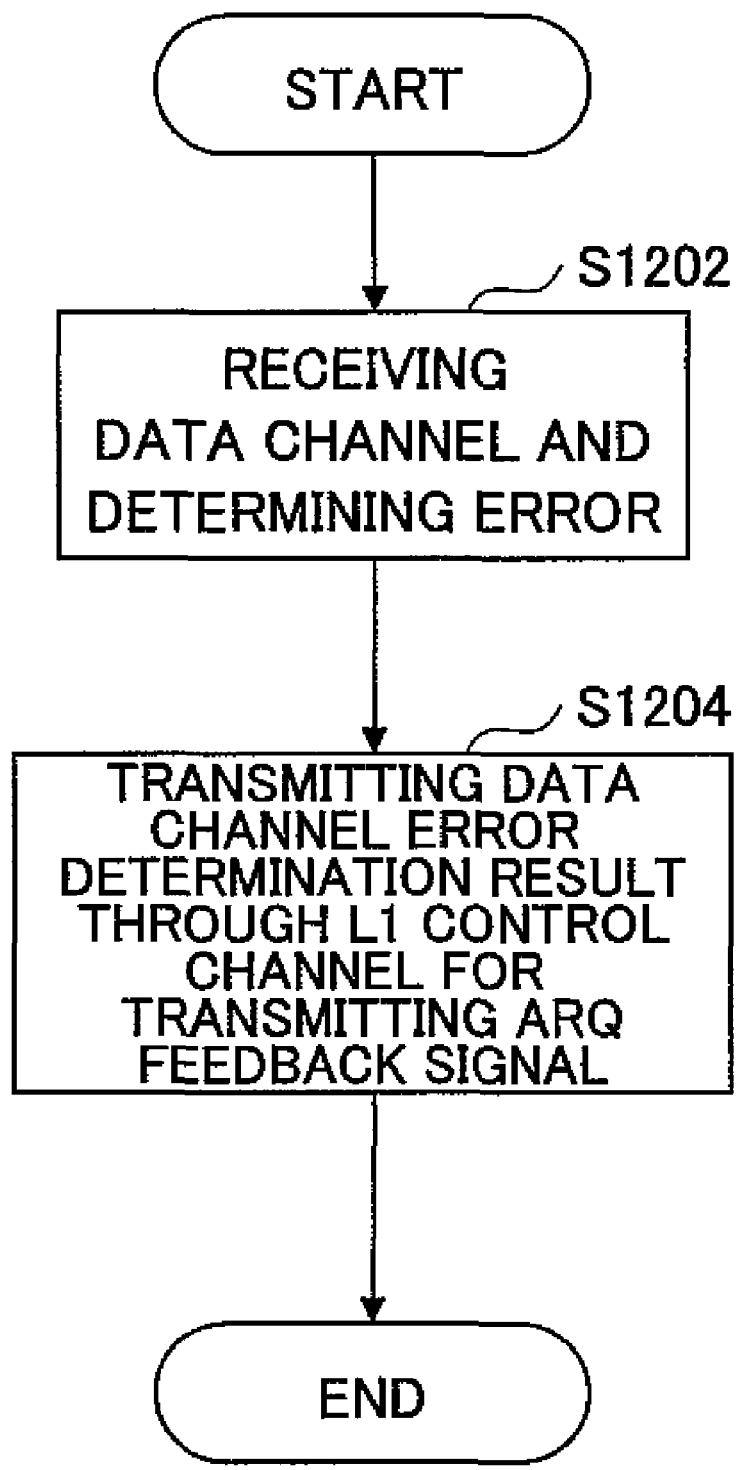
FIG. 12 is a flow chart showing a process of generating the layer 1 control channel for transmitting the ARQ feedback signal in uplink transmission.

Next, a process for generating the L1 control channel for transmitting the ARQ feedback signal is explained in reference to FIG. 12.

The base station 100 receives the uplink data channel transmitted from the mobile station 200 after having transmitted the allocated channel (step S1202). The data channel decoding portion 114 carries out error determination on the data channel (step S1202), and the L1 control channel generation portion 122 generates the L1 control channel for transmitting the ARQ feedback signal using the physical channel parameter determined by the L1 control channel physical layer parameter determination portion 116, in accordance with the error determination result, and transmits the L1 control channel through the transmission portion 102 (step S1204).

In such a manner, it becomes possible to send the physical layer parameter selected from the plural L1 control channels for transmitting the ARQ feedback signal to the mobile station, without increasing the signal amount in the allocation channel. In this case, when there are N selectable L1 control channels for transmitting the ARQ feedback signal, the signal can be reduced $\log_2$ (N) bits per 1 TTI per one ARQ connection.

With the above operations, it becomes possible to provide a function of sending the mobile station the physical channel allocation information such as the frequency block to which the ARQ feedback signal is allocated, without increasing the amount of signals in the associated control channel even in the uplink transmission.

Although the reservation channel whose number is the same as the frequency block number allocated to the L1 control channel for transmitting the ARQ feedback signal is used in this example, the corresponding relationship may be determined using a predetermined function known to the base station and the mobile station in order to relate the number allocated to the frequency block to the number allocated to the reservation channel on a one-to-one basis.

Although the mobile and base stations for uplink and downlink transmissions have been separately described in the foregoing examples according to the present invention, the mobile station and the base station may be configured so as to have both the function described in the uplink transmission and the function described in the downlink transmission.

While the ARQ is employed in the above examples, Hybrid ARQ (HARQ) may be employed.

As stated above, according to the examples of the present invention, the physical channel allocation information such as the frequency block to which the ARQ feedback signal is allocated can be sent to a receiver without increasing the amount of the signals in the associated control channel.

This international patent application is based on Japanese Priority Application No. 2005-327820, filed on Nov. 11, 2005, with the Japanese Patent Office, the entire contents of which are hereby incorporated by reference.

INDUSTRIAL APPLICABILITY

A control channel allocation apparatus, a mobile station, a base station and a control channel allocation method are applicable to a radio communications system.

The invention claimed is:
1. A control channel allocation apparatus, comprising:
a memory portion that stores an identifier indicating a layer 1 control channel associated with a downlink data channel, and a physical channel parameter for transmitting information on an uplink layer 1 control channel, the identifier being related to the physical channel parameter;
a physical layer parameter determination portion that determines the physical channel parameter for transmitting information on the uplink layer 1 control channel in accordance with the identifier;
a layer 1 control channel generation portion that generates a layer 1 control channel indicating a decoding result of a data channel, in accordance with the determined physical channel parameter; and
a transmission portion that transmits information on the generated layer 1 control channel,
wherein the identifier is a channel number of the layer 1 control channel associated with the downlink data channel, and the physical channel parameter is a frequency block number used to transmit the information on the uplink layer 1 control channel.

2. The control channel allocation apparatus of claim 1, wherein the physical layer parameter determination portion determines the physical channel parameter that transmits the information on the uplink L1 control channel on which a retransmission request feedback signal is mapped, the physical channel parameter being related to the layer 1 control channel associated with the downlink data channel on a one-to-one basis.

3. The control channel allocation apparatus of claim 1, wherein the physical layer parameter determination portion determines the frequency block for transmitting the information on the uplink L1 control channel on which a retransmission request feedback signal is mapped, in accordance with the layer 1 control channel associated with the downlink data channel on a one-to-one basis.

4. The control channel allocation apparatus of claim 1, wherein the physical layer parameter determination portion determines the physical channel parameter corresponding to the identifier in accordance with a predetermined function.

5. A mobile communications system comprising a mobile station and a base station, the mobile station including a memory portion that stores an identifier indicating a layer 1 control channel associated with a downlink data channel, and a physical channel parameter for transmitting information on an uplink layer 1 control channel, the identifier being a channel number of the layer 1 control channel related to a frequency block number stored as the parameter;

a physical layer parameter determination portion that determines the physical channel parameter for transmitting information on the uplink layer 1 control channel in accordance with the identifier;

a layer 1 control channel generation portion that generates a layer 1 control channel indicating a decoding result of a data channel in accordance with the determined physical channel parameter; and a transmission portion that transmits information on the generated layer 1 control channel, and the base station including a memory portion that stores the identifier indicating the layer 1 control channel associated with the downlink data channel, and a physical channel parameter for transmitting the uplink layer 1 control channel, the identifier being related to the physical channel parameter;

an associated control channel generation portion that generates an associated control channel for reporting allocation of transmission opportunity in the downlink data channel; and a reception portion that receives information on the uplink layer 1 control channel corresponding to the associated control channel.

6. A control channel allocation method comprising:

a reception step of receiving information on a layer 1 control channel associated with a downlink data channel;

a physical layer parameter determination step of determining a frequency block number corresponding to a channel number indicating a layer 1 control channel, in accordance with a relationship between the channel number indicating the layer 1 control channel associated with the downlink data channel and the frequency block number for transmitting information on the layer 1 control channel;

a layer 1 control channel generation step of generating the layer 1 control channel indicating a decoding result of a data channel in accordance with the determined frequency block number; and a transmission step of transmitting information on the generated layer 1 control channel.

* * * * *